Figure 1:
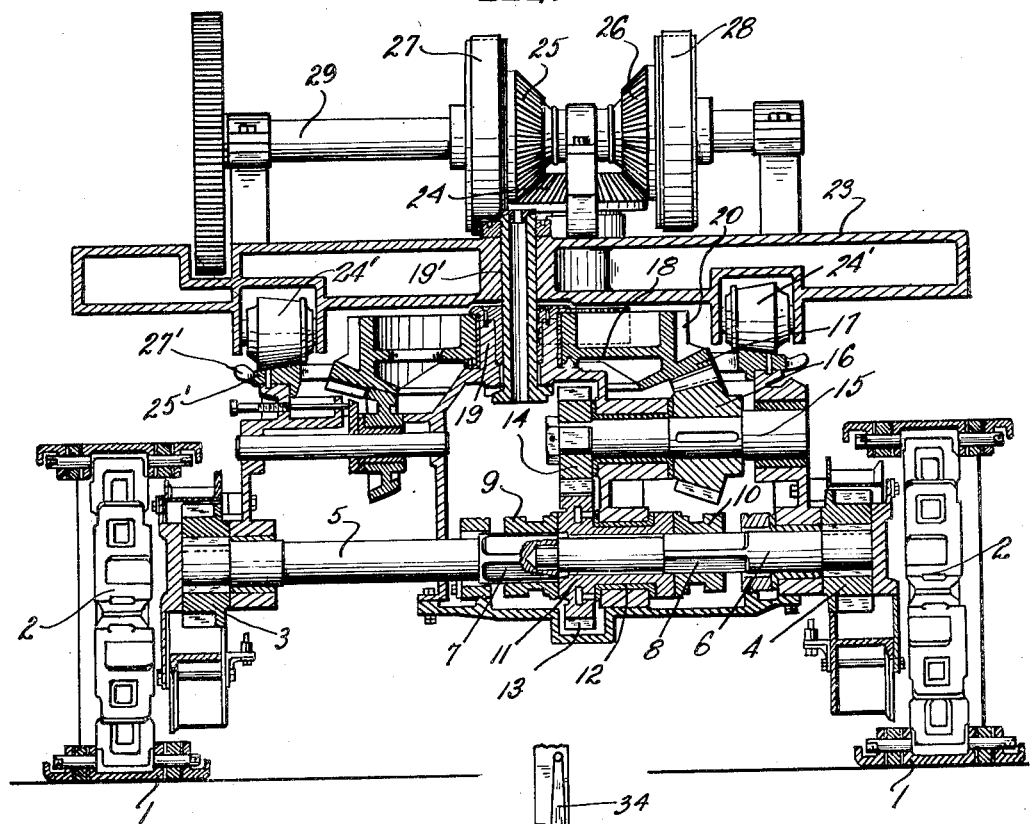

July 4, 1933.    H. E. SCOTT    1,917,160

GEAR LOCK FOR COMBINED TURN TABLES AND TRACTORS

Filed Aug. 26, 1929    2 Sheets-Sheet 1

INVENTOR
HARRY E. SCOTT
ATTORNEYS

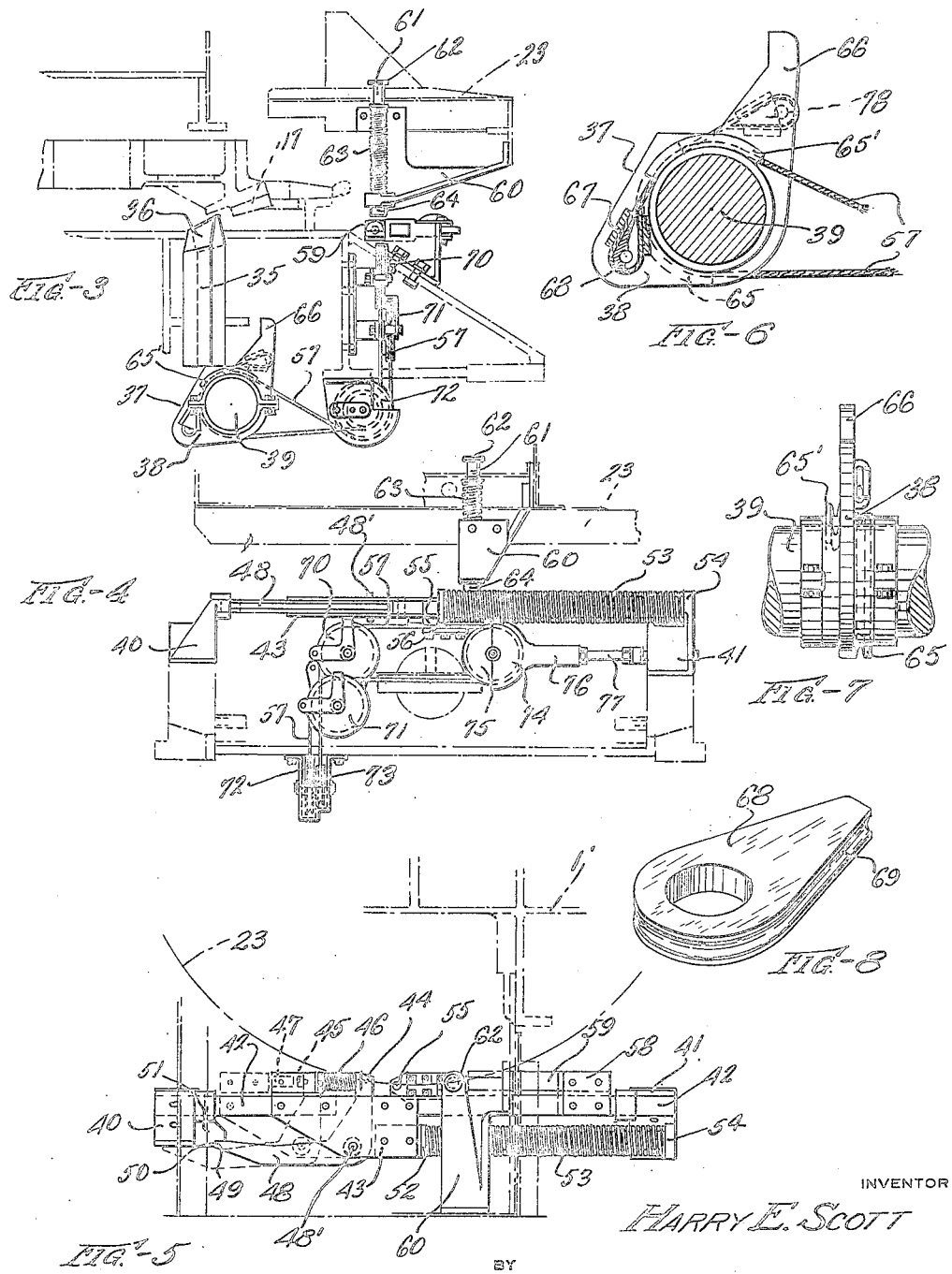

Patented July 4, 1933

1,917,160

UNITED STATES PATENT OFFICE

HARRY E. SCOTT, OF CLEVELAND HEIGHTS, OHIO, ASSIGNOR TO THE THEW SHOVEL COMPANY, OF LORAIN, OHIO, A CORPORATION OF OHIO

GEAR LOCK FOR COMBINED TURNTABLES AND TRACTORS

Application filed August 26, 1929. Serial No. 388,572.

The invention disclosed in this application relates to combined turn tables and tractors generally and particularly to locking means for locking the common driving element or gear to the truck in the utilization of the common driving element or gear in the rotation of the turn table.

In turntable and tractor or truck constructions, for example, as utilized in power shovels, it has been customary to utilize a common driving element, usually a gear about the axis of rotation of the turntable and between the motor means carried by the turntable and truck or tractor propelling mechanism on the truck or tractor frame, such common driving element being adapted to perform two functions. One of these functions is to act as a driving connection between the motor means carried by the turntable and the truck or tractor propelling mechanism on the truck or tractor frame. At this time, the turntable must be locked to the truck or tractor frame to prevent its rotation relative thereto. The other function of the common driving element is to act as a rack by means of which the turntable may be rotated through a pinion cooperating with the rack and driven by the motor means carried by the turntable. At this time, the locking means between the turntable and the truck or tractor frame must be released and, by other locking means, the common driving element must be locked to the truck or tractor frame to prevent its rotation relative thereto.
To lock the turntable and the truck or tractor frame together is relatively simple and, due to the disposition and relative position of the turntable and the truck or tractor frame, the lock may be of a type manipulated from the turntable. However, the locking means between the common driving element and the truck or tractor frame may not be so easily disposed to be manipulated from the turntable and heretofore has been operated by a device projecting from the truck or tractor frame and manipulated by an operative on the ground. To have this locking means only capable of manipulation by an operative on the ground is extremely undesirable by reason of the fact that in many instances it is necessary, or desirable, to render the lock effective at a time when it is more or less impossible, or at least inconvenient, for the turntable and truck or tractor operator to be on the ground. For example, at a time when the operator is manipulating the turntable to position a shovel and, at the same time, finds it necessary or desirable to move the whole vehicle closer to or further away from the material to be picked up by the shovel. In other words, it is more effective and more desirable to have all locks for the common driving element manipulated from the turntable and readily accessible to an operator on the vehicle.

Specifically, the invention relates to a locking device for the hereinbefore mentioned common driving element, such locking device being mounted on the truck or tractor frame, and being provided with operating mechanism on the truck or tractor frame having parts adapted to cooperate with a lock control means arranged on the turntable whereby the lock may be rendered effective to permit or prevent the common driving element forming a driving connection between the motor unit carried by the turntable and the tractor or truck propelling mechanism carried by the tractor or truck frame may be controlled from the turntable. Thus, both movement of the whole vehicle and movement of the turntable alone is all controlled by an operator on the apparatus without necessitating his descent therefrom.

The invention is briefly summarized in the following description, drawings, and claims.

Figure 2:
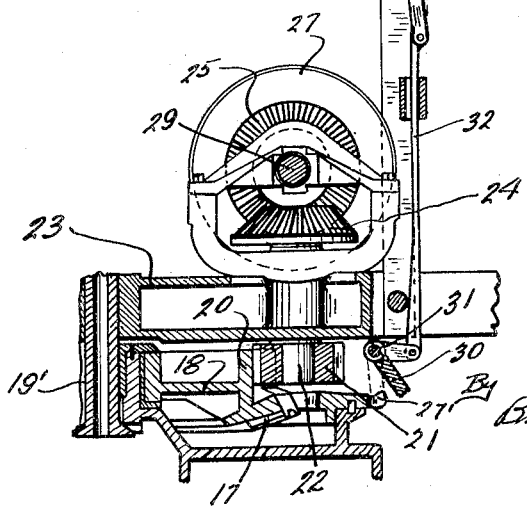

Fig. 1 is a transverse vertical section through the truck or tractor and the turn table; Fig. 2 shows the motor means on the turn table, the common driving element as well as the lock between the turn table and the truck frame; Fig. 3 is a side view partly in section and partly in elevation showing the locking mechanism between the common driving element and truck frame; Fig. 4 is a view looking from the right to left as shown in Fig. 3; Fig. 5 is a plan view; Fig. 6 is a detail side view of the cam throwing the block bolt; Fig. 7 is an edge view; Fig. 8 is a detail view of the wedge block holding the cable in the cabling sockets of the cam member.

In the embodiment shown, 1 represents the endless treads or traction elements which are adapted to support the apparatus and travel along the ground and engage suitable idlers (not shown) and drivers 2 adapted to be driven by suitable driving pinions 3 and 4 respectively which are mounted on shaft sections 5 and 6 that rotate in suitable bearings in the frame 1' of the tractor or truck. The shaft sections 5 and 6 are provided with squared portions 7 and 8 that are engaged by sliding clutch members 9 and 10 respectively, these clutch members 9 and 10 cooperating with a driven member 11 mounted in a suitable bearing 12 in the frame 1' and provided with a gear 13 that meshes with and is driven by the pinion 14 carried by a shaft 15 mounted in bearings in the frame 1' and carrying a beveled pinion 16 that is keyed thereto. This beveled pinion 16 meshes with and is adapted to be driven by a beveled gear 17 forming a part of a common driving element or gear 18 which is mounted upon a vertical bearing or sleeve 19 carried by the truck frame 1'. The mechanism just described forms the driving mechanism cooperating with the common driving element or gear 18 to actuate the treads 1 and move the tractor or truck as a whole.

As shown in Figs. 1 and 2, the drive for the common driving element or gear 18 consists of a spur pinion 21 that is disposed to be in mesh with a spur gear 20 on the common driving element or gear 18. Such spur pinion 21 is carried on the lower end of a vertical shaft 22 mounted in a suitable bearing and extending upwardly through the turntable 23 which forms a part of the apparatus and which carries at its upper end a beveled gear 24 in mesh with suitable driving gears 25 and 26, each of which is operated through its own clutch 27 and 28 respectively from a common driving shaft or power means 29.

The turntable 23 is adapted to rotate about a sleeve 19' by reason of the spur pinion 21 traveling around the spur gear 20 when the common driving element 18 is locked against rotation as hereinafter described to cause the spur gear 20 to act as a rack and, as a usual means for stabilizing the turntable 23, the turntable is provided with rollers 24' engaging a circular trackway 25' concentric with the sleeve 19'. When operating the truck or tractor as a vehicle and causing it to move from place to place under its own power, it is necessary to lock the turntable 23 to the tractor frame against rotation thereof as will be hereinafter apparent and the trackway 25' is therefore provided with suitable teeth 27' adapted to receive between them a lock 30 (see Fig. 2), swiveled at 31 and manipulated by a slide 32, link 33, and handle 34, the link 33 extending upwardly through the turntable 23 and the handle 34 being disposed above the turntable. It will be apparent that by manipulating this device the lock 30 may be lowered into the recesses between the teeth 27' and the turntable locked to the truck or tractor frame or the lock 30 may be moved to the inoperative positions shown in Fig. 2 wherein the turntable 23 is free to rotate relative to the truck or tractor frame. With the lock 30 in operative position to lock the turntable 23 against rotation relative to the truck or tractor frame 1' and the common driving element or gear 18 free to be rotatably driven by the spur pinion 20, operation of the drive shaft 29 will, through the mechanism hereinbefore described, be effective to rotate the common driving element or gear 18 and beveled gear 17 forming a part thereof and drive the treads 1 whereby the tractor or truck may be operated as a vehicle and moved from place to place under its own power.

Similarly to it being necessary to lock the turntable 23 against rotation relative to the truck or tractor frame 1' when it is desired to move the tractor or truck from place to place under its own power, it is also necessary to lock the common driving element or gear 18 against rotation when it is desired to rotate the turntable 23 with the tractor or truck remaining stationary. To do this, a locking means is provided which consists of a slidable bolt 35 (see Fig. 3) arranged in a position so that its toothed upper end 36 may be moved into and out of engagement with the recesses between the teeth of the beveled gear 17 to lock the common driving element or gear 18 against rotation and thereby effectively prevent drive from the power means carried by the turntable 23 through the common driving element or gear 18 to the endless treads 1. As shown in Fig. 3, the bolt 35 is adapted to be moved upwardly to engage the recesses between the teeth of the beveled gear 17 by a cam surface 37 that forms a part of a cam member 38 rotatably mounted on the frame as at 39, the cam member being of a nature and so disposed that, upon rotation of this member, the cam surface 37 projects the bolt 35 upwardly into engagement with the beveled gear portion 17 of the common driving element or gear 18 and locks the common driving element or gear of which the beveled gear 17 forms a part to the tractor or truck frame against rotation relative thereto.

In accordance with my invention, means have been provided for rendering this locking means effective or ineffective by power means, in this instance, by rotation of the turntable, with the movement of the locking bolt 35 into and out of locking position being controlled by operator-operated means carried by the turntable and actuatable by an operator without necessitating his descent from the turntable, in contra-distinction to the heretofore prevalent means of manipulating the locking bolt 35 or a similar locking mechanism by a hand operated device extending outwardly at the front, sides or back of the truck or tractor which necessitated descent of the operator to the ground from the turntable for manipulation thereof or by manipulation by another operator.

The operating means for rotating the cam member 38 to project the bolt 35 into engagement with the beveled gear 17 for locking the gear against movement relative to the truck or tractor frame consists of a slide bar 42 mounted in bearings 40 and 41 on the main truck or tractor frame 1' and extending well across the truck or tractor frame and tangentially to the turntable 23, the slide bar 42 being provided intermediate its ends with latch plates 43, the front one being shown in Fig. 5 and both being shown in Fig. 4, spaced apart and receiving between them a latch arm 48 pivotally mounted as at 48' on the latch plates 43 and having one end 44 thereof forming an abutment member for a purpose hereinafter described.

The slide bar 42 is normally forced toward its left-hand position, as shown in Fig. 5, by means of a spring 53 that is disposed between spring abutments 52 on the latch plates 43 and a suitable spring support 54 secured to the frame or the bearing 41, and such movement of the bar to the left results in rotation of the cam member 38 in a clockwise direction to project the bolt 35 upwardly into engagement with the teeth of the beveled gear 17, connection between the bar 42 and the cam member 38 being made by a cable 57 clamped to the bar 42 by clamping plates 55 and 56 and passing over a series of sheaves carried by the frame. Reversely, movement of the bar 42 to the left, whereupon compression of the spring 53 will occur, will result in rotation of the cam member 38 in a contra-clockwise direction as shown in Fig. 3 whereby the bolt 35 may drop out of engagement with the beveled gear 17 under its own weight or otherwise.

In the cable disposition and assembly for rotating the cam member 38, the cam member 38 is provided with an opening for receiving the shaft 39 and has sheave portions 65 and 65' (see Figs. 6 and 7) on opposite sides of a tail member 66 thereof, one of which, 65', receives one end of the cable 57 and is for the purpose of elevating the bolt 35 to locking position while the other sheave portion 65 receives the opposite end of the cable 57 and is utilized for withdrawing or releasing the bolt 35. These sheave portions are segmental in form and are so placed with respect to the cam member 38 that they properly guide the ends of the cable in the manipulation of the cam, the cam member being provided on opposite sides of the shaft 39 with wedge-shaped cable recess sockets 67 for the reception of the looped cable ends and suitable wedges 68 having peripheral grooves 69 for engaging the ends.

Referring to the sheave assembly, a pair of sheaves 70 and 71 are mounted on a suitable part of the truck frame and are arranged out of alignment with each other and one above the other, the sheave 70 receiving the cable 57 directly from the clamping means on the bar 42 consisting of the plates 55 and 56 and the other sheave 71 receiving the cable 57 from the opposite sides of the clamping means and after it passes around a sheave 75. The sheave 75 is carried in a casing 74 and takes the form of a snatch block or the like, the casing 74 having a shank 76 carrying a threaded rod 77 adjustably secured in the frame 1'. Other suitable sheaves such as 72 and 73, in this instance disposed at right angles to the sheaves 70 and 71 for convenience, lead the cable 57 from the sheaves 70 and 71 directly to the drum segments 65 and 65' on the cam member 38.

As shown in Figs. 3 and 4, the cable 57 extends from the clamping member consisting of the plates 55 and 56 over the sheave 70, around the smaller sheave 73, and to the rear sheave 65 on the cam member 38, it being passed around this sheave segment and anchored to the cam member as at 78 (see Fig. 6). The cable 57 to the right of the clamping member consisting of the plates 55 and 56 passes around the sheave 75 of the snatch block structure and thence passes around the sheave 71, sheave 72, and up over the sheave segment 65', being dead-ended on the cam member 38 in the anchoring socket 67. With this arrangement, it will be seen that when the bar 42 is moved to the left by the spring 53 the lower stretch of the cable 57 passing around the snatch block sheave 75 will move to the right and the cam member 38 will be rotated clockwise with the result that the bolt 35 is lifted upwardly by the cam member 38 into engagement with the teeth of the beveled gear 17 whereas movement of the bar 42 to the right, resulting in compression of the spring 53, will move the lower stretch of the cable that passes around the sheaves 70 and 72 to the right which will rotate the cam member 38 in a contra-clockwise direction to withdraw the bolt 35 from engagement with the beveled gear 17 or permit it to release the beveled gear by moving downwardly under its own weight. Thus, movement of the bolt 35 into and out of locking engagement with the beveled gear 17 is dependent on movement of the bar 42 to the left under the influence of the spring 53 or to the right against the resistance of such spring, the bolt 35 being out of locking position when the bar 42 is disposed to the right against the resistance of the spring 52 as shown in Figs. 3, 4 and 5.

To maintain the bar 42 to the right as shown in Figs. 4 and 5 with the spring 53 compressed and the bolt 35 out of locking engagement with the beveled gear 17, the latching means is provided which consists of the latch arm 48 pivotally mounted in the plates 43 as at 48' and normally being held in a position wherein the latch nose 49 thereof will engage a recess 50 carried by a fixed plate 51 secured to the bearing 40 by means of a spring 46, one end of which engages the abutment end 44 of the latch arm 48 and the other end of which engages a centering device 45 of a fixed stop 47 mounted between the plates 43 and on the same side of the bar 42 as the abutment 44. The purpose of the abutment 44 will be hereinafter apparent. Thus, with the latch nose 49 of the latch arm 48 engaging with the recess 50 in the fixed plate 51, it will be seen that the bar 42 will be held to the right as shown in Figs. 4 and 5 with the spring 53 compressed and the bolt 35 out of locking engagement with the beveled gear 17 whereby the beveled gear 17 and the common driving element 18 of which it forms a part is free to be rotated by the spur pinion 21.

As hereinbefore described, the latch arm 48 is normally held in its latched position by means of the spring 46 and, to permit the bar 42 to move to the left under the influence of the spring 53 and move the bolt 35 into locked position as hereinbefore described, an operator-operated means has been provided which is rendered effective by rotation of the turntable 23 for ejecting the latch nose 49 of the latch arm 48 from the recess 50 in the fixed plate 51.

As shown in Figs. 3 and 4, a bracket 60 on the turntable 23 carries a push rod 61 that extends up through the floor of the turntable which rod is provided with a foot plate 62, the push rod 61 normally being moved to and held in its upwardmost position by a spring 63. The lower end of this push rod 61 carries a roller 64 which may be moved to travel in a path including the abutment 44 on the bar 42 by depression of the rod 61. Depression of the rod 61 and movement of the roller 64 into the path including the abutment 44, when the turntable 23 is in the proper position, and rotation of the turntable in a clockwise direction will result in the roller 64 contacting with the abutment 44 and sweeping the abutment 44 to the left against the resistance of the spring 46, which spring is compressed by such movement of the abutment, and movement of the latch nose 49 out of engagement with the recess 50 and the fixed plate 51, release of this bar latching means permitting the compressed spring 53 to force the entire slide bar 42 to the left which, as hereinbefore described, will result in projection and rotation of the cam member 38 to project the bolt 35 into locking engagement with the beveled gear 17.

Likewise, means have been provided for moving the slide bar 42 to the right by rotation of the turntable 23 which will result in compression of the spring 53, rotation of the cam member 38 in contra-clockwise direction as hereinbefore described to release the bolt 35 from locking engagement with the beveled gear 17, and, at the same time, will permit the compressed spring 46 to rotate the latch arm 48 about its pivot 48' and move the latch nose 49 into engagement with the recess 50 and the fixed plate 51 with the spring 53 maintained in its compressed condition and the slide bar 42 maintained in the position to the right as shown in Figs. 4 and 5 which will maintain the lock bolt 35 out of locking engagement with the beveled gear 17 as shown in Fig. 3. To accomplish this, the slide bar 42 is provided towards its right-hand end (see Fig. 5) with suitable lug plates 58 having secured between them an abutment bar 59, the abutment bar 59 being spaced from the abutment 44. Movement of the slide bar 42 to the left as hereinbefore described will place the abutment bar 59 in the path which the roller 64 follows in rotation of the turntable 23. Hence, depression of the rod 61 to move the roller 64 downwardly will place the roller 64 in a position to contact with the abutment bar 59 when the turntable is rotated in a contra-clockwise direction and, continued rotation of the turntable in a contra-clockwise direction will force the bar 42 to the right which will be effective to compress the spring 53 as well as release the lock bar 35 and permit the slide bar locking means to become effective to hold the bar to the right and the spring 53 in compression so that, on release of the slide bar latching means, the spring 53 may move the bar 42 to the left as and for the purposes hereinbefore described. Thus, a latching means for locking the common driving element against rotation relative to the truck or tractor frame whereby it may not serve as a drive transmission to the supporting and driving members is provided, with operator-operated means actuatable from the turntable of the apparatus and rendered effective by rotation of the turntable for controlling the position and condition of this common driving element locking means.

When it is desired to lock the common driving element or gear to the frame by rotation of the turntable, it may be necessary, in some instances, for the operator to couple the driving clutch to the transmission so as to create a back pressure of load upon the common driving element whereby the turntable will rotate easier than the driving mechanism can drive the tractor or truck as a vehicle, in which case a more ready movement of the turntable is provided for unlatching the slide, as hereinbefore described, by the depression of the foot plate 62 and brings the roller 64 into the path of the abutment arm 44 to cause release of the slide 42 and movement of the bolt 35 into locking position under the operation of the spring 53.

What is claimed:

1. In a combined turntable and tractor, a tractor frame, a turntable mounted for rotation thereon, supporting and traction members carried by said frame, motor operated means carried by said turntable, drive transmission mechanism between said motor operated means, said turntable and said frame supporting and traction members, a common element in said transmission forming a part of the driving mechanism for said supporting and traction members and said turntable, means for locking said common transmission element to the tractor frame whereby it is rendered ineffective as a drive transmitting means for said motor operated means to said supporting and traction elements, said motor operated means being effective for moving said locking means to locked or unlocked position, and operator-operated control means carried by said turntable for rendering said motor operated means effective as a lock actuating means.

2. In a combined turntable and tractor, a tractor frame, a turntable mounted for rotation thereon, supporting and traction members carried by said frame, motor operated means carried by said turntable, drive transmission mechanism between said motor operated means, said turntable and said frame supporting and traction members, a common element in said transmission forming a part of the driving mechanism for said supporting and traction members and said turntable, means for locking said common transmission element against movement whereby it is rendered ineffective as a drive transmitting means from said motor operated means to said supporting and traction elements, said motor operated means being effective for moving said locking means to locked or unlocked position, and operator-operated control means carried by said turntable for rendering said motor operated means effective as a lock actuating means.

3. In a combined turntable and tractor, a tractor frame, a turntable mounted for rotation thereon, supporting and traction members carried by said frame, motor operated means carried by said turntable, drive transmission mechanism between said motor operated means, said turntable and said frame supporting and traction members, a common element in said transmission forming a part of the driving mechanism for said supporting and traction members and said turntable, means for locking said common transmission element to the tractor frame whereby it is rendered ineffective as a drive transmitting means from said motor operated means to said supporting and traction elements, said motor operated means being effective for moving said locking means to locked or unlocked position, operator-operated control means carried by said turntable for rendering said motor operated means effective as a lock actuating means, and operator-operated means carried by said turntable for locking said turntable against movement relative to said tractor frame.

4. In a combined turntable and tractor, a tractor frame, a turntable mounted for rotation thereon, supporting and traction members carried by said frame, motor operated means carried by said turntable, drive transmission mechanism between said motor operated means, said turntable and said frame supporting and traction members, a common driving element in said transmission forming a part of the driving mechanism for said supporting and traction members and said turntable, means for locking said common transmission element to the tractor frame whereby it is rendered ineffective as a drive transmitting means from said motor operated means to said supporting and traction elements, means for moving said locking means to locked or unlocked position by rotation of said turntable, and operator-operated means carried by said turntable for rendering the rotation of said turntable effective as a lock actuating means.

5. In a combined turntable and tractor, a tractor frame, a turntable mounted for rotation thereon, supporting and traction members carried by said frame, motor operated means carried by said turntable, drive transmission mechanism between said motor operated means, said turntable and said frame supporting and traction members, a common driving element in said transmission forming a part of the driving mechanism for said supporting and traction members and said turntable, means for locking said common transmission element against movement whereby it is rendered ineffective as a drive transmitting means from said motor operated means to said supporting and traction elements, means for moving said locking means to locked or unlocked position by rotation of said turntable, and operator-operated means carried by said turntable for rendering the rotation of said turntable effective as a lock actuating means.

6. In a combined turntable and tractor, a tractor frame, a turntable mounted for rotation thereon, supporting and traction members carried by said frame, motor operated means carried by said turntable, drive transmission mechanism between said motor operated means, said turntable and said frame supporting and traction members, a common driving element in said transmission forming a part of the driving mechanism for said supporting and traction members and said turntable, means for locking said common transmission element to the tractor frame whereby it is rendered ineffective as a drive transmitting means from said motor operated means to said supporting and traction elements, means for moving said locking means to locked or unlocked position by rotation of said turntable, operator-operated means carried by said turntable for rendering the rotation of said turntable effective as a lock actuating means, and operator-operated means carried by said turntable for locking said turntable against movement relative to said tractor frame.

7. In a combined turntable and tractor, a tractor frame, a turntable mounted for rotation thereon, supporting and traction members carried by said frame, motor operated means carried by said turntable, drive transmission mechanism between said motor operated means, said turntable and said frame supporting and traction members, a common element in said transmission forming a part of the driving mechanism for said supporting and traction members and said turntable, means for locking said common transmission element to the tractor frame whereby it is rendered ineffective as a drive transmitting means from said motor operated means to said supporting and traction elements, means carried by the tractor frame normally tending to move said locking means to locked position, means for maintaining said locking means in unlocked position, said motor operated means being effective to render said maintaining means ineffective whereby said transmission element locking means may be moved to locked position, and operator-operated control means carried by said turntable for rendering said motor operated means so effective.

8. In a combined turntable and tractor, a tractor frame, a turntable mounted for rotation thereon, supporting and traction members carried by said frame, motor operated means carried by said turntable, drive transmission mechanism between said motor operated means, said turntable and said frame supporting and traction members, a common element in said transmission forming a part of the driving mechanism for said supporting and traction members and said turntable, means for locking said common transmission element to the tractor frame whereby it is rendered ineffective as a drive transmitting means from said motor operated means to said supporting and traction elements, means carried by said tractor frame normally tending to move said locking means to locked position, means for maintaining said locking means in unlocked position, means for rendering said maintaining means ineffective by rotation of said turntable whereby said transmission element locking means may be moved to locked position, and operator-operated means carried by said turntable for rendering rotation of said turntable effective to release said maintaining means.

9. In a combined turntable and tractor, a tractor frame, a turntable mounted for rotation thereon, supporting and traction members carried by said frame, motor operated means carried by said turntable, drive transmission mechanism between said motor operated means, said turntable and said frame supporting and traction members, a common element in said transmission forming a part of the driving mechanism for said supporting and traction members and said turntable, means for locking said common transmission element to the tractor frame whereby it is rendered ineffective as a drive transmitting means from said motor operated means to said supporting and traction elements, means including a spring carried by said tractor frame normally tending to move said locking means to locked position, means for maintaining said locking means in unlocked position against the normal tendency of said spring, said motor operated means being effective to release said maintaining means whereby said transmission element locking means may be moved to locked position by said spring, and operator-operated control means carried by said turntable for rendering said power operated means effective to release said maintaining means.

10. In a combined turntable and tractor, a tractor frame, a turntable mounted for rotation thereon, supporting and traction members carried by said frame, motor operated means carried by said turntable, drive transmission mechanism between said motor operated means, said turntable and said frame supporting and traction members, a common element in said transmission forming a part of the driving mechanism for said supporting and traction members and said turntable, means for locking said common transmission element to the tractor frame whereby it is rendered ineffective as a drive transmitting means from said motor operated means to said supporting and traction elements, means including a spring carried by said tractor frame normally tending to move said locking means to locked position, means for maintaining said locking means in unlocked position against the normal tendency of said spring, said motor operated means being effective to release said maintaining means whereby said transmission element locking means may be moved to locked position by said spring, and operator-operated control means carried by said turntable for rendering said motor operated means effective to release said maintaining means, said motor operated means being effective to move said transmission element locking means from locked to unlocked position.

11. In a combined turntable and tractor, a tractor frame, a turntable mounted for rotation thereon, supporting and traction members carried by said frame, motor operated means carried by said turntable, drive transmission mechanism between said motor operated means, said turntable and said frame supporting and traction members, a common element in said transmission forming a part of the driving mechanism for said supporting and traction members and said turntable, means for locking said common transmission element to the tractor frame whereby it is rendered ineffective as a drive transmitting means from said motor operated means to said supporting and traction elements, means carried by the tractor frame normally tending to move said locking means to locked position, means including a latch for maintaining said locking means in unlocked position, said motor operated means being effective to release said latch whereby said transmission element locking means may be moved to locked position, and operator-operated means carried by said turntable for rendering said motor operated means effective as a latch release means.

12. In a combined turntable and tractor, a tractor frame, a turntable mounted for rotation thereon, supporting and traction members carried by said frame, motor operated means carried by said turntable, drive transmission mechanism between said motor operated means, said turntable and said frame supporting and traction members, a common element in said transmission forming a part of the driving mechanism for said supporting and traction members and said turntable, means for locking said common transmission element to the tractor frame whereby it is rendered ineffective as a drive transmitting means from said motor operated means to said supporting and traction elements, means carried by the tractor frame normally tending to move said locking means to locked position, means including a latch for maintaining said locking means in unlocked position, means for rendering said latch ineffective as a maintaining means by rotation of said turntable whereby said transmission element locking means may be moved to locked position, and operator-operated means carried by said turntable for rendering rotation of said turntable effective as a latch release means.

13. In a combined turntable and tractor, a tractor frame, a turntable mounted for rotation thereon, supporting and traction members carried by said frame, motor operated means carried by said turntable, drive transmission mechanism between said motor operated means, said turntable and said frame supporting and traction members, a common element in said transmission forming a part of the driving mechanism for said supporting and traction members and said turntable, means under the control of an operator for locking the tractor against travel including a lock carried by the tractor frame for locking said common transmission element to said tractor frame whereby it is rendered ineffective as a drive transmitting means from said motor operated means to said supporting and traction elements, and actuating means for said lock comprising a slide carried by the tractor frame, operative connections between said slide and said lock, means normally tending to move said slide to actuate said lock to locking position, means for latching said slide against its normal tendency, and operator-operated means carried by the turntable adapted to be thrown into operation by the operator for rendering said slide latching means ineffective and permit actuation of said lock to locked position.

14. A combined turntable and tractor as in claim 13 wherein the operative connections between the slide and lock comprise a cam for throwing the lock, rotating means carried by the cam, and connections between the rotating means and the slide.

15. A combined turntable and tractor as in claim 13 wherein the operative connections between the slide and the lock comprise a cam for throwing the lock, rotating means carried by the cam including drum elements carried by the cam, and rope and sheave connections between said drum elements and the said slide for moving said cam in both directions.

In testimony whereof I hereby affix my signature.

HARRY E. SCOTT.